T. A. & J. L. BROWN.
End-Gates for Wagons.
No. 143,960.　　　　　　　　　　　Patented Oct. 28, 1873.
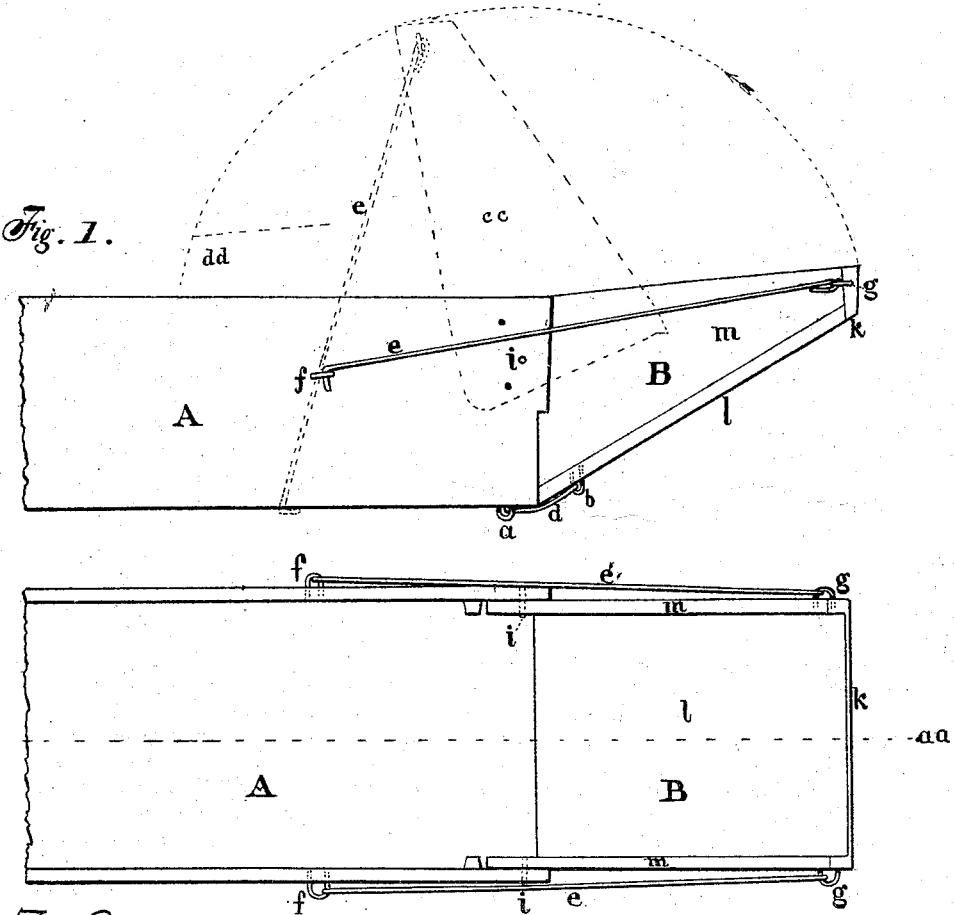
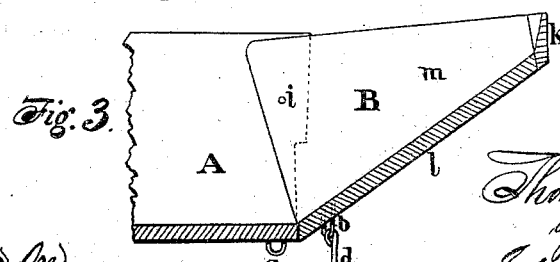

UNITED STATES PATENT OFFICE.

THOMAS A. BROWN AND JOHN L. BROWN, OF ROANOKE, ILLINOIS.

IMPROVEMENT IN END-GATES FOR WAGONS.

Specification forming part of Letters Patent No. 143,960, dated October 28, 1873; application filed July 15, 1873.

*To all whom it may concern:*

Be it known that we, THOMAS A. BROWN and JOHN L. BROWN, of Roanoke, in the county of Woodford, in the State of Illinois, have invented an Improvement in Combined End-Gate and Scoop-Box for Dumping or Shoveling out Grain, Corn, &c.; and do hereby declare that the following is a full, clear, and exact description thereof, reference being had to the annexed drawings making a part of this specification, in which like letters of reference refer to like parts, and in which—

Figure 1 represents a vertical longitudinal elevation of wagon-box and scoop-box; Fig. 2, plan of same; Fig. 3, vertical section of same along dotted lines *a a*, Fig. 2.

This invention consists of a pivoted end box, having a bottom inclining from its outer end down to and meeting the wagon-bottom, to the sides of which it is pivoted upon short pins, so as to open upward along the juncture of the box or scoop with the wagon-bottom by raising the rear end of the said scoop-box to discharge or dump the load; also, when in its normal position, to afford an inclined floor, clear of grain or other lading, in which to insert a shovel for unloading said grain, &c.

In the drawings, A represents the wagon-body, open at the rear end, within which the projecting box B is pivoted at *i i*, near the upper corners of same and the side-boards of the wagon. The box B is designed to serve both as a scoop board or box and an end-gate, and is composed of a sloping bottom, *l*, which closely joins the end of the wagon-bottom, to prevent the passage between of grain, &c., and rises from this point at an angle nearly to the level of a line or imaginary extension of the upper edges of the wagon-sides, (at about the distance of three and one-half feet to the rear of same,) where said sloping bottom is continued upward nearly vertically by an end piece, *k*. The bottom *l* and end piece *k* are fastened to the triangular boards *m m*, which form the sides of the scoop-box. These boards *m m* pass, in the present form of construction, within the wagon-sides, or without the wagon-sides in another form of construction of the invention, and are each pivoted near the upper corners to the corresponding corners of the wagon-sides at *i i*. A staple, *g g*, at either side of the rear of this box retains the eye of a rod, *e e*, on either side of the box and wagon, which rods are hooked, respectively, into a second staple, *f f*, in either side of the wagon-box. These rods act as a stay or brace to retain the scoop-box in an erect position in dumping, the staples *f f* being so set as to let the rods pass through them downward, as seen in the dotted lines, Fig. 1. A staple, *b*, in the bottom of the box carries a hook, *d*, which can be attached to a staple or eye, *a*, in the wagon-bottom, or vice versa.

The operation of this scoop-board and end-gate is as follows: In dumping "produce," as grain, &c., the box B is raised or turned upon its pivot-pins *i i*, first disengaging the hook *d*, the rods *e e* each passing downward through their respective staples *f f* into the position shown by the dotted lines in Fig. 1, and project their hooks beneath the wagon-bottom to prevent the box B from falling outward until the lading is discharged; or the box may be turned still farther, so as to be inverted, and rest by its staples *g g* upon the upper edges of wagon-sides, as seen in Fig. 1 at *d d*.

To use the box as a scooping-place for inserting a shovel, the box B is turned down to its normal position, Fig. 3, the rods *e e* slipping back through the staples *f f*. The hook *d* is placed within the staple *a* beneath the juncture of the box-bottom and the wagon-bottom. When the load is to be shoveled out the shovel is easily inserted at the rear or upper end of the box within the end piece *k*.

What we claim as our invention is—

The combination of the box B, pivoted rods *e e*, staples *f f*, wagon-box A, staple *a*, hook *d*, and staple *b*, said box pivoted at *i i* to the wagon-sides, all substantially as and for the purpose set forth.

In testimony that we claim the foregoing scoop-box and end-gate for wagons we have hereunto set our hands this 27th day of June, 1873.

THOMAS A. BROWN.
JOHN L. BROWN.

Witnesses:
ALEXANDER ORE,
JOHN MEDON.